United States Patent
Li et al.

(10) Patent No.: US 7,882,174 B2
(45) Date of Patent: Feb. 1, 2011

(54) MULTIPLE PARALLEL USER EXPERIENCES PROVIDED BY A SINGLE SET OF INTERNET HOSTING MACHINES

(75) Inventors: Margaret H. Li, Bellevue, WA (US); Maxim A. Ivanov, Redmond, WA (US); Vani Mandava, Bellevue, WA (US); Vadim V. Varfolomeyev, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 162 days.

(21) Appl. No.: 12/240,383

(22) Filed: Sep. 29, 2008

(65) Prior Publication Data

US 2010/0082813 A1 Apr. 1, 2010

(51) Int. Cl.
  *G06F 15/16* (2006.01)
(52) U.S. Cl. ............... 709/203; 709/219; 709/226; 709/228; 709/229; 709/244; 709/246
(58) Field of Classification Search .......... 709/203, 709/219, 226, 228, 229, 244, 246
See application file for complete search history.

(56) References Cited

U.S. PATENT DOCUMENTS

| | | | |
|---|---|---|---|
| 6,345,307 B1 * | 2/2002 | Booth ................. | 709/247 |
| 6,560,639 B1 * | 5/2003 | Dan et al. ............ | 709/218 |
| 6,643,708 B1 * | 11/2003 | Francis et al. ....... | 709/246 |
| 6,768,988 B2 * | 7/2004 | Boreham et al. ..... | 1/1 |
| 6,859,820 B1 * | 2/2005 | Hauduc et al. ....... | 709/203 |
| 6,996,780 B2 * | 2/2006 | Estrada ............... | 715/751 |
| 7,062,506 B2 | 6/2006 | Taylor | |
| 7,089,319 B2 * | 8/2006 | Lysenko et al. ...... | 709/231 |
| 7,379,427 B2 | 5/2008 | Boss et al. | |
| 7,389,219 B2 | 6/2008 | Loisey et al. | |
| 7,490,072 B1 * | 2/2009 | Cowan et al. ........ | 706/47 |
| 7,562,358 B2 * | 7/2009 | Bennett et al. ....... | 717/170 |
| 2002/0013831 A1 | 1/2002 | Astala et al. | |
| 2002/0062361 A1 * | 5/2002 | Kivipuro et al. ..... | 709/219 |

(Continued)

FOREIGN PATENT DOCUMENTS

WO WO 2010/036491 A3 4/2010

OTHER PUBLICATIONS

Brewer, Eric A., Scalable Internet Services, "*Lessons from Giant-Scale Services*,"Jul.-Aug. 2001, 10 pages.

(Continued)

*Primary Examiner*—Michael Won
(74) *Attorney, Agent, or Firm*—Merchant & Gould P.C.

(57) ABSTRACT

This disclosure describes techniques of using a hosting device to provide multiple versions of a single web application. As described in detail below, the hosting device stores resources associated with different versions of the web application in different subdirectories. When the hosting device receives a request associated with the web application, the hosting device automatically identifies one of the versions of the web application as an applicable version of the web application. The hosting device rewrites a pathname in the request to include a subdirectory name of the subdirectory that stores the applicable version of the web application. The hosting device then dereferences the resource identified by the rewritten pathname. In this way, the hosting device uses the resources of the applicable version of the web application to process the request.

19 Claims, 5 Drawing Sheets

U.S. PATENT DOCUMENTS

| | | | |
|---|---|---|---|
| 2002/0078092 A1* | 6/2002 | Kim | 707/513 |
| 2003/0159135 A1 | 8/2003 | Hiller | |
| 2004/0123285 A1 | 6/2004 | Berg | |
| 2004/0168153 A1 | 8/2004 | Marvin | |
| 2007/0288915 A1 | 12/2007 | Zotter et al. | |
| 2008/0178169 A1 | 7/2008 | Grossner et al. | |
| 2008/0281969 A1 | 11/2008 | Horton | |

OTHER PUBLICATIONS

Gorbenko et al., "*Dependable Composite Web Services with Components Upgraded Online*," accessed Sep. 29, 2008, 31 pages.

Kirda et al., Web Engineering, "*Experiences in Engineering Flexible Web Services*," Jan.-Mar. 2001, ©2001, pp. 2-9.

International Search Report completion date Mar. 15, 2010 included in Appln No. WO 2010/036491 A3, 4 pages.

* cited by examiner

MULTIPLE PARALLEL USER EXPERIENCES PROVIDED BY A SINGLE SET OF INTERNET HOSTING MACHINES

BACKGROUND

A web application is an application that is accessed via a web browser over a network, such as the Internet or an intranet. Web applications are essential tools in today's business world. For example, a salesperson can use her web browser on her personal computer to access a web application provided by her company to enter sales into a sales database. In another example, a college student can use a web browser on his personal computer to access a web application provided by his university to register for classes.

In many circumstances, a web application provider may wish to provide different versions of a web application to different groups of users. For example, a company with a multinational sales force may be wish to provide a first version of a sales-entry web application to its European salespersons and a second version of the sales-entry web application to its North American salespersons. In this example, the different versions of the web application may collect different data in order to comply with different regulations. In another example, a web application provider may wish to provide an updated version of a web application to a set of beta users while continuing to provide a current version of the web application to the general public.

In order to implement different versions of a web application, a web application provider may need to implement different versions of equivalent resources, such as software modules, images, videos, and so on. Furthermore, because the web application provider may need to implement different versions of equivalent software modules, the web application provider may need to install the different versions of the equivalent software modules on different sets of physical hosting devices. For example, the web application provider may need to install the software modules needed by a first version of the web application on a first set of physical hosting devices and may need to install the software modules needed by the second version of the web application on a second set of physical hosting devices. The web application provider may need to install the different versions of the equivalent software modules on different sets of physical hosting devices because equivalent resources associated with the different versions of the web application may have the same filenames and therefore cannot be stored at the same location within a file system directory structure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes techniques of using a single hosting device to provide multiple versions of a single web application. As described in detail below, the hosting device stores resources associated with different versions of the web application in different directories. When the hosting device receives a request associated with the web application from a client device, the hosting device automatically identifies one of the versions of the web application as an applicable version of the web application. The hosting device rewrites a pathname in the request to include a subdirectory name of the subdirectory that stores the applicable version of the web application. The hosting device then dereferences the resource identified by the rewritten pathname. In this way, the hosting device uses the resources of the applicable version of the web application to process the request.

DETAILED DESCRIPTION

In general, this disclosure describes techniques of using a single hosting device to provide multiple versions of a single web application. Each of the versions of the web application may provide a different user experience. In the following description, various examples are described. It should be appreciated that these examples are provided for purposes of explanation and not as express or implied limitations on the scopes of the claims.

Figure 1:
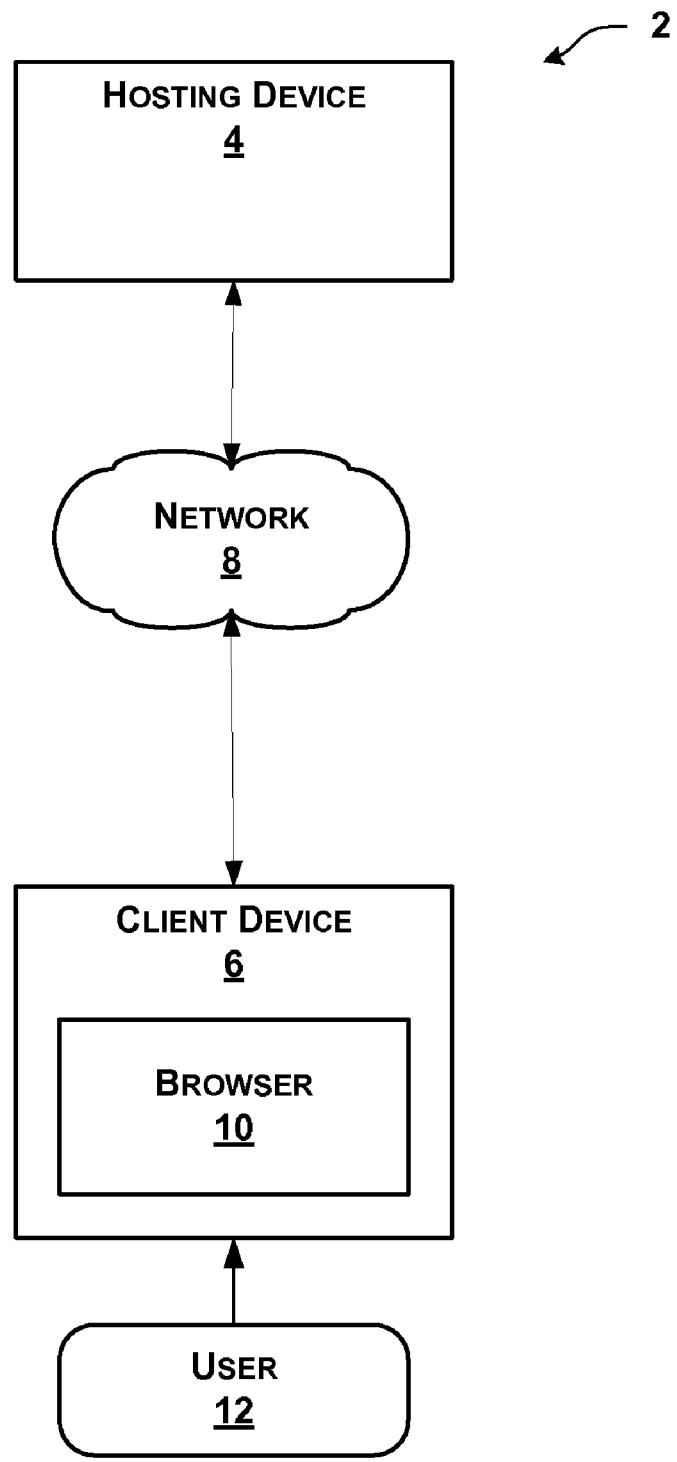
FIG. 1 is a block diagram illustrating an example system that includes a hosting device that implements the techniques of this disclosure.

FIG. 1 is a block diagram illustrating an example system 2. As illustrated in the example of FIG. 1, system 2 includes a hosting device 4 that hosts multiple versions of a web application. Hosting device 4 is a physical electronic computing device that may, in some instances, be divided into a plurality of separate physical units. In these instances, these physical units may communicate with one another using a variety of communications technologies including bus technologies, interconnect technologies, network technologies, and other communications technologies. For example, hosting device 4 may be a single standalone server device, a cluster of server devices, a server blade, or another type of physical electronic computing device.

As used in this disclosure, the term "web application" refers to an application that is accessed via a web browser over a network, such as the Internet or an intranet. Hosting device 4 may host a wide variety of different types of web applications. For example, hosting device 4 may host business process web applications, electronic mail web applications, electronic calendaring web applications, electronic collaboration web applications, and other types of web applications. In one specific example, hosting device 4 hosts multiple versions of a web application based on the Microsoft Office Live Workspace collaboration application tool.

Hosting device 4 includes a computer-readable storage medium that stores a hierarchical directory system. The directory structure contains a set of subdirectories. Each of the subdirectories is associated with a subdirectory name. For example, a first subdirectory may be associated with the subdirectory name "root/version_2008_01/" and a second subdirectory may be associated with the subdirectory name "root/version_2008_02/".

Stored within each subdirectory in this set of directories is a different set of resources associated with a different version of the same web application. Otherwise stated, stored within a first subdirectory of the directory system is a first set of resources associated with a first version of the web application and, stored within a second subdirectory of the directory system is a second set of resources associated with a second version of the web application, and so on.

The resources in each of the subdirectories may be a wide variety of different types of resources. For example, the resources in a first one of the subdirectories may include image files, audio files, video files, Hypertext Markup Language (HTML) files, JavaScript scripts, VBScript scripts, Extensible Markup Language (XML) documents, Dynamic Link Library (DLL) files, ASP.NET pages, Cascading Style Sheet files, configuration files, Java Applets, ActiveX objects, Common Gateway Interface (CGI) scripts, PHP scripts, and other types of resources.

Each version of the web application is designed to provide a different user experience for the web application. Otherwise stated, a first version of the web application is designed to provide a first user experience, a second version of the web application is designed to provide a second user experience, and so on. The user experiences provided by different versions of the web application may differ in many ways. For example, different user experiences of the web application may provide different functionalities, different appearances, different user interface, and other differing features. In one particular example, a first user experience of a sales-entry web application may require a user to enter a particular piece of data when entering sales data into a web page provided by the first version of the web application and a second user experience provided by a second version of the sales-entry web application may not require the user to enter the particular piece of data when entering sales data into an equivalent web page provided by the second version of the web application.

System 2 also includes a client device 6. Client device 6 may be a wide variety of different types of electronic computing devices. For example, client device 6 may be a personal computer, a mobile telephone, a personal media player, a network appliance, an intermediate network device, a mainframe computer, a device integrated into a vehicle, a laptop computer, a television set-top box, a handheld computing device, or another type of computing device.

In addition, system 2 includes a network 8. Network 8 is an electronic communication network that facilitates communication between client device 6 and hosting device 4. Network 8 may be a wide variety of different types of electronic communication networks. For example, network 8 may be the Internet, an intranet, a local-area network, a wide-area network, a personal-area network, an ad hoc network, or another type of network. Moreover, network 8 may include wireless and or wired communication links. A variety of communications protocols may be used on links within network 8 including, for example, Ethernet, WiFi, WiMax, Bluetooth, Code-Division Multiple Access (CDMA), and other communications protocols.

Client device 6 includes a browser 10. Browser 10 is an Internet browsing application executing on client device 6. For example, browser 10 may be an instance of the Microsoft INTERNET EXPLORER® internet browser, the Mozilla Firefox internet browser, the Google Chrome internet browser, the Apple Safari internet browser, the Opera internet browser, the BlackBerry internet browser, or another type of internet browser.

A user 12 of client device 6 may use browser 10 to interact with the web application hosted by hosting device 4. To initiate interaction with the web application hosted by hosting device 4, browser 10 sends a request associated with the web application to hosting device 4 via network 8. For example, user 12 may enter a Uniform Resource Locator (URL) into an address bar of a user interface generated by browser 10. In this example, the URL specifies a host name associated with hosting device 4 and a pathname associated with the web application. For instance, the user may enter the URL "http://www.example.com/myWebApp/origin.aspx" into the address bar of the user interface generated by browser 10. In this instance, the domain name portion of the URL is "www.example.com" and the pathname is "myWebApp/origin.aspx". Furthermore, in this example, browser 10 may, in response to the entry of the URL, generate and send a Hypertext Transfer Protocol (HTTP) request message to hosting device 4 via network 8. In this example, the HTTP request message may specify the host name associated with hosting device 4 and the pathname associated with the web application. For instance, if the user entered the URL "http://www.example.com/myWebApp/origin.aspx" into the address bar of the user interface generated by browser 10, browser 10 may generate and send the following HTTP request message:

GET /myWebApp/origin.aspx HTTP/1.1
Host: www.example.com

Hosting device 4, in response to the request, automatically identifies an applicable version of the web application from a set of versions of the web application. As described below, hosting device 4 may automatically identify the applicable version of the web application in a variety of ways. For example, hosting device 4 may automatically identify a first version of the web application as the applicable version when the user of client device 6 has set browser 10 to use the German language and may automatically identify a second version of the web application as the applicable version when the user of client device 6 has set browser 10 to use the Russian language.

After identifying the applicable version of the web application, hosting device 4 rewrites the request such that the pathname in the request includes a subdirectory name of the subdirectory that contains the resources associated with the applicable version of the web application. For example, the subdirectory name of the subdirectory that contains the resources associated with the applicable version of the web application may be "root/version_2008_02/" and the initial HTTP request may be the following:

GET /myWebApp/origin.aspx HTTP/1.1
Host: www.example.com

In this example, hosting device 4 may rewrite this request, resulting in the following HTTP request:

GET /root/version_2008_02/myWebApp/origin.aspx HTTP/1.1
Host: www.example.com

After hosting device 4 rewrites the request, hosting device 4 dereferences the resource identified by the pathname specified by the rewritten request. As used in this disclosure, the phrase "to dereference" means to obtain a resource identified by a reference identifier. Dereferencing a resource may be as simple as retrieving a resource stored on a computer-readable storage medium. In another instance, dereferencing may require executing one or more scripts or assemblies in order to obtain the resource.

Because hosting device 4 rewrites the pathname in the request to include the subdirectory name of the subdirectory that stores the resources associated with the applicable version of the web application and because the applicable version of the web application may differ from request to request, hosting device 4 may dereference two different resources when hosting device 4 received two request that specify the same pathname. For instance, a first user may enter the URL "http://www.example.com/root/myWebApp/origin.aspx" into the address bar of the first user's browser and a second user may enter an identical URL into the address bar of the second user's browser. Upon receiving the two resulting request, hosting device 4 may dereference two different resources because the first user and the second user may have different applicable versions of the web application.

After hosting device 4 dereferences the resource identified by the pathname specified by the rewritten request, hosting device 4 may send the resource to client device 6. For example, hosting device 4 may send an HTTP response that includes one or more header fields and a body that contains the resource. In this example, the HTTP response may be partitioned into a plurality of data packets for transmission on network 8.

Figure 2:
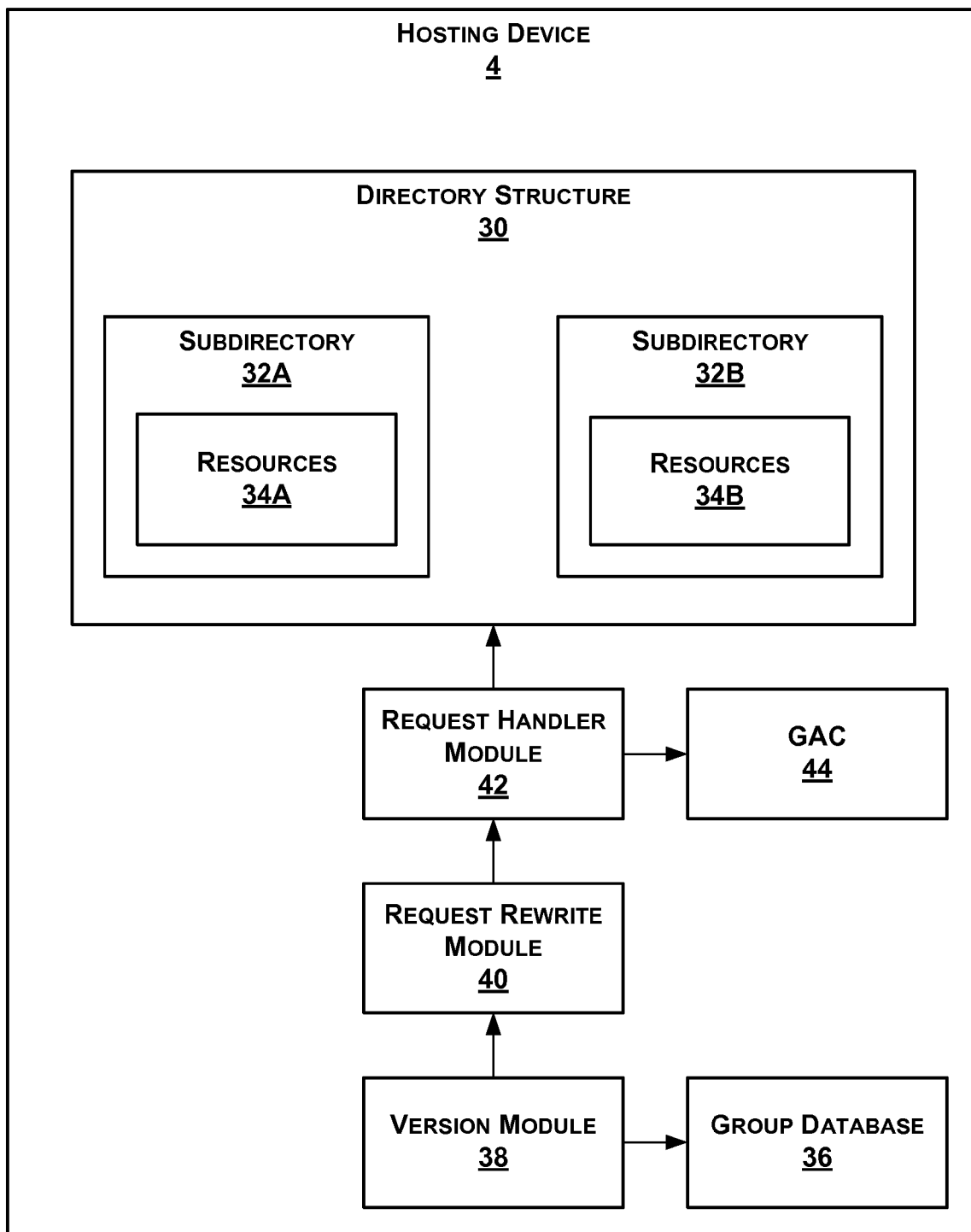
FIG. 2 is a block diagram illustrating example logical components of the hosting device.

FIG. 2 is a block diagram illustrating example logical components of hosting device 4. As illustrated in the example of FIG. 2, hosting device 4 comprises a directory structure 30 that represents a hierarchy of directories for organizing files. Directory structure 30 may be implemented using a variety of file system architectures including, but not limited to, FAT32, NTFS, HPFS, Google File System, Hierarchical File System Plus (HFS+), or another type of file system.

Directory structure 30 includes subdirectories 32A and 32B. Subdirectory 32A is not a descendant directory or an ancestor directory of subdirectory 32B. However, subdirectory 32A and subdirectory 32B may be child directories of a single immediate parent directory. Subdirectory 32A and subdirectory 32B are associated with subdirectory names. For example, subdirectory 32A may be associated with the subdirectory name "version_2008_01" and subdirectory 32B may be associated with the subdirectory name "version_2008_02". Although not shown in the example of FIG. 2, subdirectory 32A and subdirectory 32B may include one or more child directories that may in turn include one or more descendant directories, and so on. In instances when subdirectory 32A and subdirectory 32B include descendant subdirectories, the descendant subdirectories of subdirectory 32A and the descendant subdirectories of subdirectory 32B may have the same structure.

Subdirectory 32A stores a set of resources 34A that are associated with a first version of a web application. Subdirectory 32B stores a set of resources 34B that are associated with a second version of the web application. As discussed above, resources 34A and resources 34B may be a wide variety of different types of resources, including, but not limited to DLLs, scripts, image files, video files, audio files, and so on. Although not shown in the example of FIG. 2, directory structure 30 may contain additional subdirectories containing resources associated with additional versions of the web application.

In some instances, one of resources 34A may have the same filename as one of resources 34B, but may operate differently. For example, resources 34A may include a file named "salesEntry.dll" and resources 34B may include a file named "saleEntry.dll". These two files named "saleEntry.dll" may provide different functionality. In other instances, each of resources 34A may correspond to an equivalently-named resource in resources 34B.

In the example of FIG. 2, hosting device 4 includes a group database 36 that stores information that associates versions of the web application with groups of users. For instance, group database 36 may store a set of rules, each of which specifies a precondition and a version of the web application. In this instance, when the precondition specified by a rule is true, the version of the web application may be determined to be the applicable version of the web application. Group database 36 may store a wide variety of rules based on a wide variety of preconditions, some of which may or may not be dependent on content of requests received by hosting device 4.

In a first example, HTTP requests may contain an "Accept-Language" header that specifies one or more acceptable languages for an HTTP response. In this first example, group database 36 may include a rule that dictates that the applicable version of the web application is the first version of the web application when an HTTP request contains an "Accept-Language" header that specifies "German". In this first example, group database 36 may also include a rule that dictates that the applicable version of the web application is the second version of the web application when an HTTP request contains an "Accept-Language" header that specifies "English." In this first example, the first version and the second version of the web application may provide different user experiences that are not mere translations of the same user experience.

In a second example, HTTP requests may contain a "User-Agent" header that specifies a user agent string of the user agent. In this instance, group database 36 may include a rule that dictates that the applicable version of the web application is the first version of the web application when the HTTP request contains a "User-Agent" header that specifies that the user agent is the Mozilla Firefox internet browser. In this instance, group database 36 may also include a rule that dictates that the applicable version of the web application is the second version of the web application when the HTTP request contains a "User-Agent" header that specifies that the user agent is the Internet Explorer internet browser.

In a third example, users may be required to log in to hosting device 4 to access the web application. In this third example, group database 36 may include preference data that specifies the preferences of each of the users. For instance, a first user may prefer to use a first version of the web application and a second user may prefer to use a second version of the web application. In some circumstances, one rule in group database 36 may dictate that the applicable version of the web application for a user is a first version of the web application, but the user's preferences may indicate that the user prefers to use a second version of the web application. In these circumstances, the user's preference may have a greater importance. Thus, the user may effectively opt out of using the first version of the web application in favor of using the second version of the web application or may toggle between using the first version of the web application and the second version of the web application. These circumstances may arise frequently when a web application provider is rolling out a version of a web application that has a new user interface when many users like the current user interface.

The rules in group database 36 may be structured for a variety of purposes. In a first example, a new version of a web application may be ready for use in a first geographic region, but not ready for use in a second geographic region. In this first example, the rules in group database 36 may be structured such that users in the first geographic region are able to use the new version of a web application while users in the second geographic region continue using an existing version of the web application. This may enable a provider of the web application to quickly get the new version of the web application into the marketplace in the first geographic region without having to wait for a worldwide rollout. In a second example, a provider may be performing beta testing on a new version of a web application while continuing to provide an existing version of the web application. In this second example, the rules in group database 36 may be structured such that users who have volunteered to be beta testers can interact with the new version of the web application while other users can continue to interact with the existing version of the web application. Although these examples discuss old and new versions of the web application, the versions of the web application do not need to have such a relationship.

Hosting device 4 also comprises a version module 38. Version module 38 receives a request associated with the web application. In response to receiving the request, version module 38 automatically identifies an applicable version of the web application. In the example of FIG. 2, version module 38 uses the information in group database 36 to identify the version of the web application associated with the user of client device 6. For instance, if group database 36 uses a set of rules that dictate the applicable version of the web application, version module 38 may automatically identify the applicable version of the web application by automatically applying the rules to the request.

After version module 38 automatically identifies the applicable version of the web application, a request rewrite module 40 in hosting device 4 may rewrite the request such that the pathname included in the request includes the subdirectory name of the subdirectory that stores the resources associated with the applicable version of the web application. For example, if the resources associated with the applicable version of the web application are stored in subdirectory 32A, request rewrite module 40 may rewrite the request such that the pathname specified by the request includes the subdirectory name associated with subdirectory 32A.

After request rewrite module 40 rewrites the request, a request handler module 42 dereferences the resource identified by the pathname specified by the rewritten request. Because the pathname specified by the rewritten request includes the subdirectory name of the subdirectory that stores the resources associated with the applicable version of the web application, request handler module 42 accesses a resource in the subdirectory that stores the resources associated with the applicable version of the web application as opposed to a resource in a subdirectory that stores resources associated with a different version of the web application. For example, if the pathname specified by the rewritten request includes the subdirectory name associated with subdirectory 32A, request handler module 42 dereferences a resource in subdirectory 32A instead of an equivalently named resource in subdirectory 32B.

As illustrated in the example of FIG. 2, hosting device 4 may also comprise a global assembly cache (GAC) 44. GAC 44 is a machine-wide repository for .NET assemblies. Each assembly is a code library formatted in the Common Intermediate Language (CIL). The assemblies may be process assemblies or library assemblies. A process assembly represents a process that uses classes defined in the library assemblies. Hosting device 4 may load into memory a single copy of each library assembly installed in GAC 44. Many different programs executing on hosting device 4 may invoke methods of the single copy of a library assembly loaded into memory. This may reduce the need for hosting device 4 to simultaneously store several copies of a common set of functionality in memory.

Dereferencing one or more of the resources 34A or 34B may require request handler module 42 to utilize one or more assemblies installed in GAC 44. For example, a resource in subdirectory 32A may be an ASP.NET page that contains a server-side script that utilizes a function provided by a first version of an assembly stored in GAC 44. Furthermore, in this example, a resource in subdirectory 32B may be an ASP.NET page that includes a server-side script that utilizes a function provided by a second version of the assembly in GAC 44.

Subdirectory 32A may contain a web configuration file that specifies bindings between resources in subdirectory 32A and versions of assemblies in GAC 44. For example, GAC 44 may contain a first version and a second version of a "Webcontrols.dll" assembly. In this example, the web configuration file of subdirectory 32A may specify that invocations of methods of the "Webcontrols.dll" assembly by resources in subdirectory 32A are to be directed to the first version of the "Webcontrols.dll" assembly in GAC 44. Subdirectory 32B and other subdirectories containing resources associated with versions of the web application may contain similar web configuration files. Continuing the previous example, the web configuration file of subdirectory 32B may specify that invocations of methods of the "Webcontrols.dll" assembly by resources in subdirectory 32B are to be directed to the second version of the "Webcontrols.dll" assembly in GAC 44. In this way, resources associated with different versions of the web application are able to utilize different versions of the assemblies installed in GAC 44.

As discussed above, each of the versions of the web application may provide a different user experience. As used in this disclosure, a "user experience" is a way a user interacts with a web application. Two users may have the same user experience with a web application even though the users are viewing pages provided by the web application that are in different languages. For example, a version of a web application may provide a first version of a web page to a first user and a second version of the web page to a second user. In this example, the first version of the web page and the second version of the web page may have exactly the same layout and functionality, but may differ in that the particular elements, such as text or graphics, may be substituted for one another. For instance, text in the first web page may be written in Portuguese and the text in the second web page may be written in French. In this example, the first user and the second user may have the same user experience because the first user and the second user may interact with the web application in same way. In contrast, different versions of a web application may provide different user experiences if users have to interact with pages differently due to differences in layout of pages, functionality of pages, organization of the site, and so on.

To further illustrate this, consider that .NET satellite assemblies may be used to provide different static elements, but not change how a user interacts with a web application. For instance, an ASP.NET page may include a server-side script that invokes a method provided by a library assembly. By default, the method of the library assembly may return strings in the English language. In this example, a satellite assembly may be associated with the library assembly. The satellite assembly is associated with a particular culture and contains static (i.e., non-code) resources that localize the operation of the library assembly to the particular culture. In a typical use, the satellite assembly contains strings in the language of the particular culture. For instance, the satellite assembly associated with the French Canadian culture may contain strings in the French Canadian dialect. When the server-side script in the ASP.NET page invokes the method provided by the library assembly and a culture preference is set to French Canadian, the method returns strings in the French Canadian dialect instead of in the English language. The strings may be URLs of images, text to include in a web page, and so on. In this way, by providing a set of satellite assemblies, a web designer can provide a web page in different languages without rewriting the library assembly used to create the web page. In other words, a single library assembly, when accompanied by a set of satellite assemblies, can generate web pages in a plurality of languages. However, the use of satellite assemblies in a web application does not provide different user experiences because all users have fundamentally the same experience when interacting with the web application.

Figure 3:
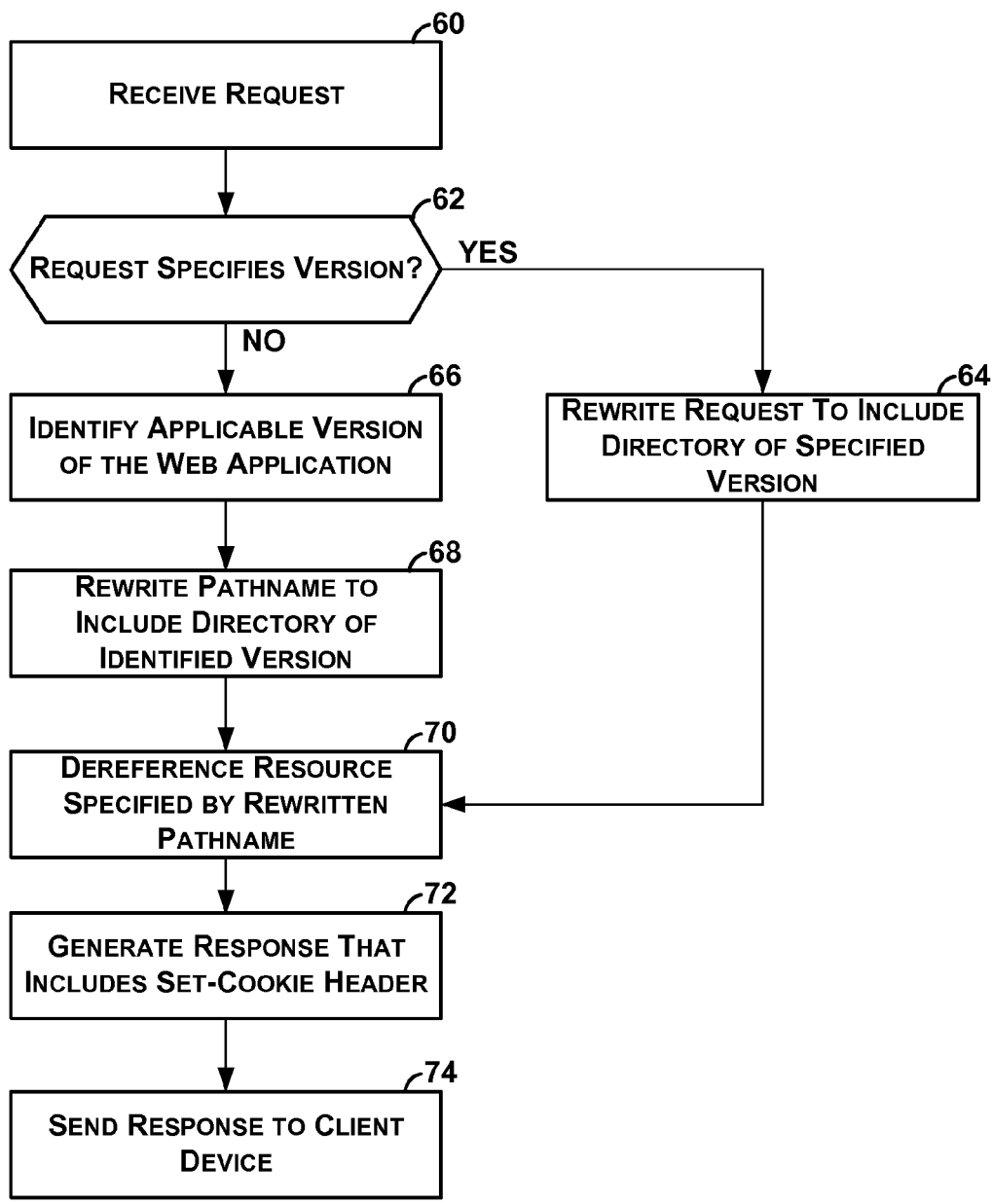
FIG. 3 is a flowchart illustrating an example operation of the logical components of the hosting device.

FIG. 3 is a flowchart illustrating an example operation of hosting device 4 with reference to the logical components illustrated in the example of FIG. 2. As illustrated in the example of FIG. 3, version module 38 receives a request associated with the web application from client device 6 via network 8 (60). Next, version module 38 determines whether the request includes a version identifier that identifies a version of the web application (62). For example, version module 38 may determine whether the request includes a cookie that specifies a version identifier that identifies a version of the web application. If it is determined that the request includes a version identifier that identifies a version of the web application ("YES" of 62), request rewrite module 40 rewrites the pathname specified by the request such that the pathname includes the subdirectory name of the subdirectory that stores the resources associated with the specified version of the web application (64). In the scenario in which it is determined that the request specifies a version of the web application, the specified version of the web application is the applicable version of the web application.

On the other hand, if it is determined that the request does not include a version identifier that identifies a version of the web application ("NO" of 62), version module 38 may automatically identify an applicable version of the web application (66). As discussed above with reference to FIG. 2, version module 38 may use group database 44 to identify the applicable version of the web application.

After version module 38 automatically identifies the applicable version of the web application, request rewrite module 40 rewrites the pathname specified by the request such that the pathname includes the subdirectory name of the subdirectory that contains the resources associated with the applicable version of the web application (68). Because request rewrite module 40 rewrites the pathname at hosting device 4, client device 6 may not receive any indication that the pathname has been rewritten.

Once request rewrite module 40 rewrites the pathname specified by the request either in step 64 or in step 68, request handler module 42 dereferences the resource identified by the pathname in the rewritten request (70). For example, request handler module 42 may dereference an ASP.NET page specified by the pathname by executing a script in the ASP.NET page that generates an HTML file. In another instance, request handler module 42 may dereference a common gateway interface (CGI) resource specified by the pathname by providing information in the request to the CGI resource.

After request handler module 42 dereferences the resource identified by the pathname in the rewritten request, request handler module 42 may generate a response to the request (72). If the response is an HTTP response, the response may contain a set-cookie header that instructs client device 6 to set a cookie that contains a version identifier of the applicable version of the web application. Consequently, client device 6 will include the contents of the "Set-Cookie" header in subsequent HTTP requests associated with the web application. In another example, request handler module 42 may rewrite the response such that pathnames in the response that specify locations of resources associated with the web application include the subdirectory name of the subdirectory that stores resources associated with the applicable version of the web application. These techniques may enable hosting device 4 to forego the potentially expensive step of using group database 36 to identify the applicable version of the web application.

After generating the response to the request, request handler module 42 may send the response to client device 6 (74).

It should be appreciated that the operation illustrated in the example of FIG. 3 is merely one example operation of hosting device 4. For example, in another example operation of hosting device 4, version module 38 may determine that the request specifies a version identifier when the pathname specified by the request includes the subdirectory name of a subdirectory that stores resources associated with a version of the web application. In this example, if the pathname specified by the request includes the subdirectory name of a subdirectory that stores resources associated with a version of the web application, there may be no need for request rewrite module 40 to rewrite the pathname specified by the request.

Figure 4:
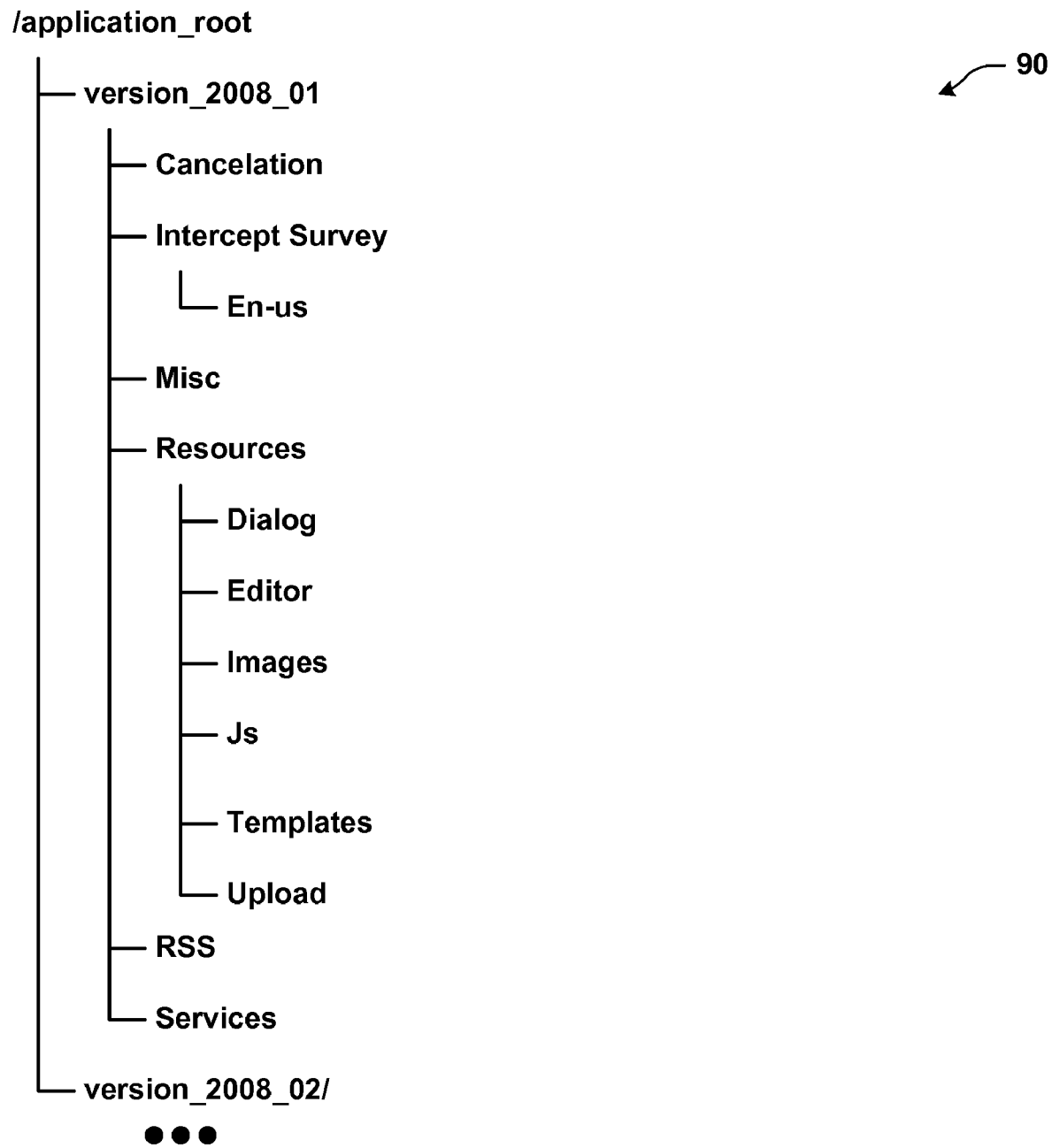
FIG. 4 illustrates an example directory structure.

FIG. 4 is a diagram of a directory structure 90 that may be used to store resources associated with two versions of a web application. As illustrated in the example of FIG. 4, directory structure 90 includes a directory associated with the directory name "/application_root". The "/application_root" directory includes a first subdirectory associated with the directory name "version_2008_01" and a second subdirectory associated with the directory name "version_2008_02". In other words, the "version_2008_01" subdirectory and the "version_2008_02" subdirectory are child directories of a single immediate parent directory (i.e., the "/application_root" directory). The "version_2008_01" subdirectory may store resources associated with a first version of a web application and the "version_2008_02" subdirectory may store resources associated with a second version of the web application.

The example of FIG. 4 further illustrates that the "version_2008_01" subdirectory includes a "Cancelation" subdirectory, an "Intercept Survey" subdirectory", a "Misc" subdirectory, a "Resources" subdirectory, a "RSS" subdirectory, and a "Services" subdirectory. In addition, the example of FIG. 4 illustrates that the "Intercept Survey" subdirectory includes an "En-us" subdirectory. The example of FIG. 4 also illustrates that the "Resources" subdirectory includes a "Dialog" subdirectory, an "Editor" subdirectory, an "Images" subdirectory, a "Js" subdirectory, a "Templates" subdirectory, a "RSS" subdirectory, and a "Services" subdirectory. Although not illustrated in the example of FIG. 4, the "version_2008_02" subdirectory may have the same or similar subdirectories as the "version_2008_01" subdirectory.

Directory structure 90 may be used to provide examples of how request rewrite module 40 may rewrite a request. In one such example, version module 38 may identify a version of a web application whose resources are stored in the "version_2008_01" subdirectory. In this example, request rewrite module 40 may receive a request that specifies the following pathname: "application_root/Resources/Images/logo.jpg". This pathname does not correspond to a pathname of a subdirectory in directory structure 90. When request rewrite module 40 receives the request, request rewrite module 40 may rewrite the pathname in the request such that the pathname reads as follows: "application_root/version_2008_01/Resources/Images/logo.jpg".

Figure 5:
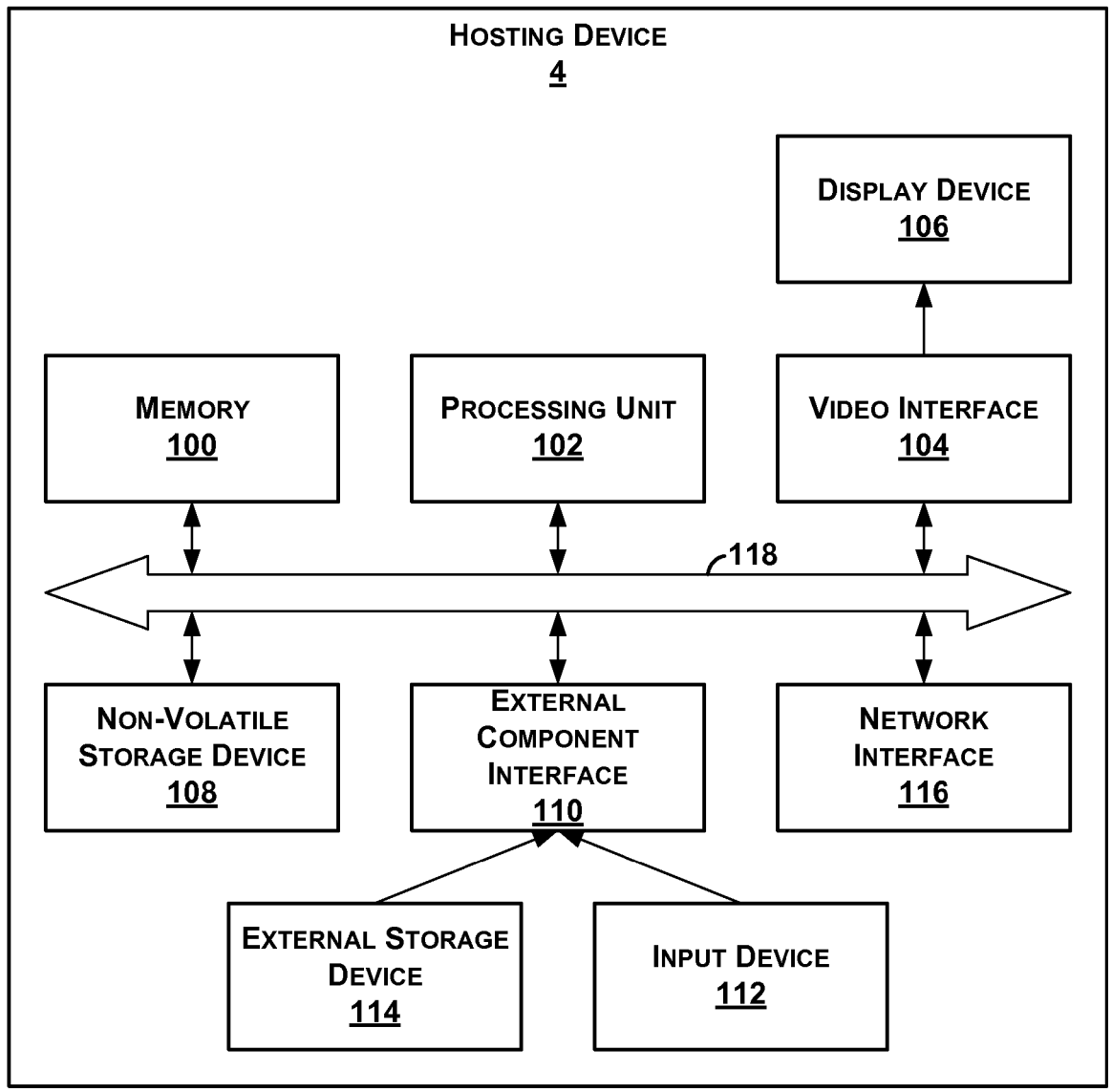
FIG. 5 is a block diagram illustrating example hardware components of the hosting device.

FIG. 5 is a block diagram illustrating example hardware components of hosting device 4. As illustrated in the example of FIG. 5, hosting device 4 comprises a memory unit 100. Memory unit 100 is a computer-readable storage medium that is capable of storing data and instructions. Memory unit 100 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, hosting device 4 comprises a processing unit 102 that is capable of executing instructions. Processing unit 102 may be implemented as one or more processing cores and/or as one or more separate microprocessors. For example, processing unit 102 may be implemented as one or more Intel Core 2 microprocessors. Processing unit 102 may be capable of executing instructions in an instruction set, such as the x86 instruction set, the POWER instruction set, a RISC instruction set, the SPARC instruction set, the IA-64 instruction set, the MIPS instruction set, or another instruction set.

Hosting device 4 also comprises a video interface 104 that enables hosting device 4 to output video information to a display device 106. Display device 106 may be a variety of different types of display devices. For instance, display device 106 may be a cathode-ray tube display, an LCD display panel, a plasma screen display panel, a touch-sensitive display panel, a LED array, or another type of display device.

In addition, hosting device 4 includes a non-volatile storage device 108. Non-volatile storage device 108 is a computer-readable storage medium that is capable of storing data and/or instructions. Non-volatile storage device 108 may be a variety of different types of different non-volatile storage devices. For example, non-volatile storage device 108 may be one or more hard disk drives, magnetic tape drives, CD-ROM drives, DVD-ROM drives, Blu-Ray disc drives, or other types of non-volatile storage devices.

Hosting device 4 also includes an external component interface 110 that enables hosting device 4 to communicate with external components. As illustrated in the example of FIG. 5, external component interface 110 communicates with an input device 112 and an external storage device 114. In one implementation of hosting device 4, external component interface is a Universal Serial Bus (USB) interface. In other implementations of hosting device 4, hosting device 4 may include another type of interface that enables hosting device 4 to communicate with input device and/or output devices. For instance, hosting device 4 may include a PS/2 interface. Input device 112 may be a variety of different types of devices including, but not limited to keyboards, mice, trackballs, stylus input devices, touch pads, touch-sensitive display screens, or other types of input devices. External storage device 114 may be a variety of different types of computer-readable storage media including magnetic tape, flash memory modules, magnetic disk drives, optical disc drives, and other computer-readable storage media.

In addition, hosting device 4 includes a network interface 116 that enables hosting device 4 to send data to and receive data from network 8. Network interface 116 may be a variety of different types of network interface. For example, network interface 116 may be an Ethernet interface, a token-ring network interface, a fiber optic network interface, a wireless network interface (e.g., WiFi, WiMax, etc.), or another type of network interface.

Hosting device 4 also includes a communications medium 118 that facilitates communication among the various components of hosting device 4. Communications medium 118 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fibre Channel interconnect, a USB bus, a Small Computer System Interface (SCSI) interface, or another type of communications medium.

Several computer-readable storage media are illustrated in the example of FIG. 5 (i.e., memory 100, non-volatile storage device 108, and external storage device 114). Together, these computer-readable storage media may constitute a single logical computer-readable storage medium. This single logical computer-readable storage medium may store instructions executable by processing unit 102. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 102, to perform the action.

The techniques of this disclosure may be conceptualized in a variety of ways. For example, the techniques of this disclosure may be conceptualized as a method for providing multiple versions of a web application. The method comprising storing, on a computer-readable storage medium accessible to a computing device, a hierarchical directory system that contains a set of subdirectories, each having a subdirectory name. In addition, the method comprises storing, on the computer-readable medium, within each of the subdirectories, resources associated with a different version of a web application in a set of versions of the web application, wherein each of the versions of the web application provides a different user experience. The method also comprises receiving, at the computing device, a request that specifies a pathname of a resource associated with the web application from a client device via an electronic communications network. Furthermore, the method comprises in response to receiving the request, automatically identifying, at the computing device, an applicable version of the web application from the set of versions of the web application. The method also comprises rewriting, at the computing device, the request such that the pathname includes the subdirectory name of the subdirectory that stores the resources associated with the applicable version of the web application. Moreover, the method comprises after rewriting the request, dereferencing, at the computing device, a resource identified by the pathname in the rewritten request.

In another example, the techniques of this disclosure may be conceptualized as an electronic computing device comprising a processing unit that is capable of executing instructions. The electronic computing device also comprises a network interface that facilitates communication on an electronic communications network that includes a client device. Furthermore, the electronic computing device comprises a non-volatile storage device that stores: a hierarchical directory system that contains a set of subdirectories that are child directories of a single parent directory, wherein each subdirectory in the set of subdirectories has a subdirectory name, and within each of the subdirectories, resources associated with a different version of a web application in a set of versions of the web application. Each of the versions of the web application provides a different user experience. The electronic computing device also comprises a version module that receives a request that specifies a pathname of a resource associated with the web application from the client device via the electronic communications network and, in response to receiving the request, automatically identifies an applicable version of the web application from the set of versions of the web application. In addition, the electronic computing device comprises a request rewrite module that rewrites the request such that the pathname includes the subdirectory name of the subdirectory that stores the resources associated with the applicable version of the web application. Furthermore, the electronic computing device comprises a request handler module that, after the request has been rewritten, dereferences a resource identified by the pathname in the rewritten request and sends the resource identified by the pathname in the rewritten request to the client device.

The techniques of this disclosure may also be conceptualized as a computer-readable storage medium comprising a hierarchical directory system that contains a plurality of subdirectories. Each of the subdirectories is associated with a different subdirectory name. Each of the subdirectories stores resources associated with a different version of a web application in a set of versions of the web application. Each of the subdirectories is a child directory of a single immediate parent subdirectory. There is an equivalently-named resource in each of the subdirectories. Each of the versions of the web application provides a different user experience by providing a different set of functionality and a different user interface. The computer-readable storage medium also comprises a group database that comprises a set of rules, each of which specifies a condition and one of the versions of the web application. Furthermore, the computer-readable storage medium comprises instructions that, when executed at a computing device, cause the computing device to receive a Hypertext Transfer Protocol (HTTP) request that specifies a pathname of a resource associated with the web application from a client device via an electronic communications network. The instructions also cause the computing device to in response to receiving the HTTP request, determine whether the HTTP request includes a version identifier that identifies an applicable version of the web application, wherein the applicable version of the web application is one of the versions of the web application. Furthermore, the instructions cause the computing device to use the rules to automatically identify the applicable version of the web application from the set of versions of the web application when the HTTP request does not include a version identifier that identifies the applicable version of the web application. The instructions also cause the computing device to rewrite the HTTP request such that the pathname includes the subdirectory name of the subdirectory that stores the resources associated with the applicable version of the web application, thereby causing the pathname to identify a resource in the subdirectory that stores the resources associated with the applicable version of the web application. Furthermore, the instructions cause the computing device to after rewriting the HTTP request, dereference a resource identified by the pathname in the rewritten HTTP request. The instructions also cause the computing device to generate a HTTP response to the HTTP request, the HTTP response containing the resource identified by the pathname in the rewritten HTTP request and data that configures the client device to include the version identifier that identifies the applicable version of the web application in subsequent HTTP requests associated with the web application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for providing multiple versions of a web application, the method comprising:

storing, on a computer-readable storage medium accessible to a computing device, a hierarchical directory system that contains a set of subdirectories, each having a subdirectory name;

storing, on the computer-readable storage medium, within each of the subdirectories, resources associated with a different version of a web application in a set of versions of the web application, wherein each of the versions of the web application provides a different user experience;

receiving, at the computing device, a request that specifies a pathname of a resource associated with the web application from a client device via an electronic communications network;

determining whether the request specifies an applicable version of the web application;

in response to determining that the request does not specify the applicable version of the web application, automatically identifying, at the computing device, the applicable version of the web application from among the set of versions of the web application;

rewriting, at the computing device, the request such that the pathname includes the subdirectory name of the subdirectory that stores the resources associated with the applicable version of the web application; and after rewriting the request, dereferencing, at the computing device, a resource identified by the pathname in the rewritten request.

2. The method of claim 1, further comprising:

storing, at the computer-readable storage medium, information that associates the versions of the web application with groups of users; and wherein automatically identifying the applicable version of the web application comprises using the information that associates the versions of the web application with groups of users to identify the version of the web application associated with a user of the client device, thereby identifying the applicable version of the web application.

3. The method of claim 2, wherein storing information that associates the versions of the web application with groups of users comprises storing a set of rules, each of which specifies a condition and one of the versions of the web application; and wherein using the information that associates the versions of the web application with groups of users to identify the version of the web application associated with a user of the client device comprises evaluating the rules.

4. The method of claim 3, wherein receiving the request comprises receiving a Hypertext Transfer Protocol (HTTP) request that contains an "Accept-Language" header that specifies an acceptable language; and wherein storing the set of rules comprises storing a rule that specifies a condition based on a value of the "Accept-Language" header of the HTTP request.

5. The method of claim 1, wherein the method further comprises storing preference data that specifies that a user prefers a first one of the versions of the web application; and wherein automatically identifying the applicable version of the web application comprises using the preference data to identify the first one of the version of the web application as the applicable version of the web application when the client device is used by the user.

6. The method of claim 1, wherein the resource identified by the pathname in the rewritten request includes a server-side script; and wherein dereferencing the resources identified by the pathname in the rewritten request comprises executing the server-side script.

7. The method of claim 1, further comprising:
after dereferencing the resource identified by the pathname in the rewritten request, generating, at the computing device, an HTTP response that contains the resource identified by the pathname in the rewritten request; and
sending the HTTP response to the client device.

8. The method of claim 7, wherein generating the HTTP response comprises rewriting the HTTP response such that pathnames in the HTTP response that specify locations of resources associated with the web application include the subdirectory name of the subdirectory that stores resources associated with the applicable version of the web application.

9. The method of claim 7, wherein generating the HTTP response comprises generating the HTTP response such that the HTTP response includes a header that instructs the client device to set a cookie that contains a version identifier that identifies the applicable version of the web application.

10. The method of claim 1, wherein determining whether the request specifies an applicable version of the web application comprises determining, at the computing device, whether the request comprises a version identifier that identifies the applicable version of the web application.

11. The method of claim 1, wherein a first one of the versions of the web application provides a different user experience than a second one of the versions of the web application by virtue of presenting a different user interface than a user interface presented by the second one of the versions of the web application.

12. The method of claim 1, wherein a first one of the versions of the web application provides a different user experience than a second one of the versions of the web application by virtue of providing different functionality than a user interface presented by the second one of the versions of the web application.

13. The method of claim 1, wherein at least a first one of the subdirectories and a second one of the subdirectories are child directories of a single immediate parent subdirectory.

14. An electronic computing device comprising:
a processing unit;
a network interface that facilitates communication on an electronic communications network that includes a client device;
one or more computer-readable storage media that store:
a hierarchical directory system that contains a set of subdirectories that are child directories of a single parent directory, wherein each subdirectory in the set of subdirectories has a subdirectory name, and within each of the subdirectories, resources associated with a different version of a web application in a plurality of versions of the web application, wherein each of the versions of the web application provides a different user experience; and
computer-executable instructions that, when executed by the processing unit, cause the electronic computing device to:
determine whether a request received from the client device via the electronic communications network specifies an applicable version of the web application, the request specifying a pathname of a resource associated with the web application;
identify, in response to determining that the request does not specify the applicable version of the web application, the applicable version of the web application from among the plurality of versions of the web application;
rewrite the request such that the pathname includes the subdirectory name of the subdirectory that stores the resources associated with the applicable version of the web application;
after the request has been rewritten, dereference a resource identified by the pathname in the rewritten request; and
send the resource identified by the pathname in the rewritten request to the client device.

15. The electronic computing device of claim 14,
wherein the one or more computer-readable storage media store a group database that contains information that associates the versions of the web application with groups of users; and
wherein the computer-executable instructions, when executed by the processing unit, cause the electronic computing device to use the group database to identify the applicable version of the web application.

16. The electronic computing device of claim 14,
wherein the resource identified by the pathname in the rewritten request includes a server-side script; and
wherein the computer-executable instructions, when executed by the processing unit, cause the electronic computing device to dereference the resource identified by the pathname in the rewritten request in part by executing the server-side script.

17. The electronic computing device of claim 14,
wherein the one or more computer-readable storage media store preference data that specifies that a user prefers a first one of the versions of the web application; and
wherein the computer-executable instructions, when executed by the processing unit, cause the electronic computing device to use the preference data to identify the first one of the versions of the web application as the applicable version of the web application when the client device is used by the user.

18. A computer-readable storage device comprising:
a hierarchical directory system that contains a plurality of subdirectories,
wherein each of the subdirectories is associated with a different subdirectory name,
wherein each of the subdirectories stores resources associated with a different version of a web application in a set of versions of the web application,
wherein there is an equivalently-named resource in each of the subdirectories,
wherein each of the subdirectories is a child directory of a single immediate parent subdirectory, and
wherein each of the versions of the web application provides a different user experience by providing a different set of functionality and a different user interface;
a group database that comprises a set of rules, each of which specifies a condition and one of the versions of the web application; and
instructions that, when executed at a computing device, cause the computing device to:
receive a Hypertext Transfer Protocol (HTTP) request that specifies a pathname of a resource associated with the web application from a client device via an electronic communications network;
in response to receiving the HTTP request, determine whether the HTTP request includes a version identifier that identifies an applicable version of the web application, wherein the applicable version of the web application is one of the versions of the web application;

use the rules to automatically identify the applicable version of the web application from the set of versions of the web application when the HTTP request does not include a version identifier that identifies the applicable version of the web application;

rewrite the HTTP request such that the pathname includes the subdirectory name of the subdirectory that stores the resources associated with the applicable version of the web application, thereby causing the pathname to identify a resource in the subdirectory that stores the resources associated with the applicable version of the web application;

after rewriting the HTTP request, dereference a resource identified by the pathname in the rewritten HTTP request; and generate a HTTP response to the HTTP request, the HTTP response containing the resource identified by the pathname in the rewritten HTTP request and data that configures the client device to include the version identifier that identifies the applicable version of the web application in subsequent HTTP requests associated with the web application.

19. The computer-readable storage device of claim 18, further comprising preference data that specifies that a user prefers a first one of the versions of the web application; and wherein the instructions cause the computing device to automatically identify the applicable version of the web application in part by causing the computing device to use the preference data to identify the first one of the versions of the web application as the applicable version of the web application when the client device is used by the user.

* * * * *